(12) United States Patent
Candelore et al.

(10) Patent No.: US 7,225,164 B1
(45) Date of Patent: May 29, 2007

(54) METHOD AND APPARATUS FOR IMPLEMENTING REVOCATION IN BROADCAST NETWORKS

(75) Inventors: Brant L. Candelore, Escondido, CA (US); Mark Eyer, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/504,968

(22) Filed: Feb. 15, 2000

(51) Int. Cl.
*G06F 17/60* (2006.01)

(52) U.S. Cl. .............. 705/57; 705/50; 705/51; 705/52; 705/57; 705/59

(58) Field of Classification Search .......... 705/58, 705/57, 51; 713/158, 155
See application file for complete search history.

(56) References Cited

U.S. PATENT DOCUMENTS

| | | | |
|---|---|---|---|
| 3,852,519 A | 12/1974 | Court | 178/5.1 |
| 4,381,519 A | 4/1983 | Wilkinson et al. | |
| 4,419,693 A | 12/1983 | Wilkinson | |
| 4,521,853 A | 6/1985 | Guttag | |
| 4,634,808 A | 1/1987 | Moerder | |
| 4,700,387 A | 10/1987 | Hirata | |
| 4,703,351 A | 10/1987 | Kondo | |
| 4,703,352 A | 10/1987 | Kondo | |
| 4,710,811 A | 12/1987 | Kondo | |
| 4,722,003 A | 1/1988 | Kondo | |
| 4,739,510 A | 4/1988 | Jeffers et al. | 350/15 |
| 4,772,947 A | 9/1988 | Kono | |

(Continued)

FOREIGN PATENT DOCUMENTS

| | | | |
|---|---|---|---|
| CA | 2328645 | * | 7/2001 |
| EP | 0471373 | | 2/1992 |
| EP | 0527611 | | 7/1992 |
| EP | 0558016 | | 2/1993 |
| EP | 0596826 | | 4/1993 |
| EP | 0610587 | | 12/1993 |
| EP | 0680209 | | 4/1995 |
| EP | 08333517 | | 4/1998 |
| EP | 0866615 | | 9/1998 |
| JP | 7067028 | | 3/1995 |
| JP | 11159162 | | 6/1999 |
| WO | WO8607224 | | 12/1986 |
| WO | WO9738530 | | 10/1997 |
| WO | WO 00/51039 A1 | * | 8/2000 |
| WO | WO 01/11819 A1 | * | 2/2001 |

OTHER PUBLICATIONS

Moni Naor, Kobbi Nissim, Certificate Revocatin and Certifcate update, Apr. 2000, IEEE Journal on Selected Areas in Communications, IEEE, vol. 18, No. 4, pp. 561–570.*

Joon S. Park, Ravi Sanduh, Biding identities and Attributes using Digitaclly Signed Certificates, 2000 IEEE.*

Peter Pizza, E–Signed, Sealed, and Delivered, Apr. 2001, Security Management, vol. 45, No. 4, pp. 72–77.*

(Continued)

*Primary Examiner*—Firmin Backer
(74) *Attorney, Agent, or Firm*—Blakely, Sokoloff, Taylor & Zafman LLP

(57) ABSTRACT

A method of revoking a descrambling privilege for copy controlled content to a host device is provided. The method includes receiving copy controlled content at a conditional access module. A revocation list is also received at the module. The method includes determining whether the host device associated with the module is on the list. If so, the conditional access module will not descramble the content.

42 Claims, 4 Drawing Sheets

U.S. PATENT DOCUMENTS

| | | | |
|---|---|---|---|
| 4,785,361 A * | 11/1988 | Brotby | 705/58 |
| 4,788,589 A | 11/1988 | Kondo | |
| 4,802,215 A | 1/1989 | Mason | 380/21 |
| 4,803,725 A | 2/1989 | Horne et al. | 380/44 |
| 4,815,078 A | 3/1989 | Shimura | |
| 4,845,560 A | 7/1989 | Kondo et al. | |
| 4,887,296 A | 12/1989 | Horne | |
| 4,890,161 A | 12/1989 | Kondo | |
| 4,924,310 A | 5/1990 | von Brandt | |
| 4,944,006 A | 7/1990 | Citta et al. | 380/20 |
| 4,953,023 A | 8/1990 | Kondo | |
| 4,995,080 A | 2/1991 | Bestler et al. | 380/21 |
| 5,018,197 A | 5/1991 | Jones et al. | 380/20 |
| 5,023,710 A | 6/1991 | Kondo et al. | |
| 5,091,936 A | 2/1992 | Katznelson et al. | 380/19 |
| 5,122,873 A | 6/1992 | Golin | |
| 5,138,659 A | 8/1992 | Kelkar et al. | |
| 5,142,537 A | 8/1992 | Kutner et al. | |
| 5,144,662 A | 9/1992 | Welmer | |
| 5,159,452 A | 10/1992 | Kinoshita et al. | |
| 5,196,931 A | 3/1993 | Kondo | |
| 5,208,816 A | 5/1993 | Seshardi et al. | |
| 5,237,424 A | 8/1993 | Nishino et al. | |
| 5,241,381 A | 8/1993 | Kondo | |
| 5,247,575 A | 9/1993 | Sprague et al. | 380/9 |
| 5,258,835 A | 11/1993 | Kato | |
| 5,325,432 A | 6/1994 | Gardeck et al. | 380/21 |
| 5,327,502 A | 7/1994 | Katata | |
| 5,359,694 A | 10/1994 | Concordel | |
| 5,379,072 A | 1/1995 | Kondo | |
| 5,398,078 A | 3/1995 | Masuda et al. | |
| 5,416,651 A | 5/1995 | Uetake et al. | |
| 5,416,847 A | 5/1995 | Boze | |
| 5,420,866 A | 5/1995 | Wasilewski et al. | 370/110.1 |
| 5,428,403 A | 6/1995 | Andrew et al. | |
| 5,434,716 A | 7/1995 | Sugiyama et al. | |
| 5,438,369 A | 8/1995 | Citta et al. | |
| 5,469,216 A | 11/1995 | Takahashi et al. | |
| 5,471,501 A | 11/1995 | Parr et al. | |
| 5,473,692 A | 12/1995 | Davis | |
| 5,481,554 A | 1/1996 | Kondo | |
| 5,481,627 A | 1/1996 | Kim | |
| 5,485,577 A | 1/1996 | Eyer et al. | |
| 5,528,608 A | 6/1996 | Shimizume | |
| 5,535,276 A | 7/1996 | Ganesan | 380/25 |
| 5,539,823 A | 7/1996 | Martin et al. | 380/26 |
| 5,539,828 A | 7/1996 | Davis | |
| 5,555,305 A | 9/1996 | Robinson et al. | 380/14 |
| 5,561,713 A | 10/1996 | Suh | 380/10 |
| 5,568,552 A | 10/1996 | Davis | |
| 5,574,787 A | 11/1996 | Ryan | |
| 5,582,470 A | 12/1996 | Yu | |
| 5,598,214 A | 1/1997 | Kondo et al. | |
| 5,600,721 A | 2/1997 | Kitazato | |
| 5,606,359 A | 2/1997 | Youden et al. | 387/7 |
| 5,608,448 A | 3/1997 | Smoral et al. | 348/7 |
| 5,615,265 A | 3/1997 | Coutrot | |
| 5,617,333 A | 4/1997 | Oyamada et al. | |
| 5,625,715 A | 4/1997 | Trew et al. | |
| 5,629,981 A | 5/1997 | Nerlikar | |
| 5,652,795 A | 7/1997 | Dillon et al. | |
| 5,663,764 A | 9/1997 | Kondo et al. | |
| 5,666,293 A | 9/1997 | Metz et al. | |
| 5,703,889 A | 12/1997 | Shimoda et al. | |
| 5,717,814 A | 2/1998 | Abecassis | 386/46 |
| 5,732,346 A | 3/1998 | Lazaridis et al. | |
| 5,742,680 A | 4/1998 | Wilson | 380/16 |
| 5,742,681 A | 4/1998 | Giachetti et al. | 380/20 |
| 5,751,280 A | 5/1998 | Abbott et al. | 345/302 |
| 5,751,743 A | 5/1998 | Takizawa | |
| 5,751,813 A | 5/1998 | Dorenbos | 380/49 |
| 5,754,650 A | 5/1998 | Katznelson | 380/15 |
| 5,757,417 A | 5/1998 | Aras et al. | 348/10 |
| 5,757,909 A | 5/1998 | Park | |
| 5,768,539 A | 6/1998 | Metz et al. | |
| 5,796,786 A | 8/1998 | Lee | |
| 5,796,829 A | 8/1998 | Newby et al. | |
| 5,796,840 A | 8/1998 | Davis | |
| 5,802,176 A | 9/1998 | Audebert | |
| 5,805,700 A | 9/1998 | Nardone et al. | 380/10 |
| 5,805,712 A | 9/1998 | Davis | |
| 5,805,762 A | 9/1998 | Boyce et al. | |
| 5,809,147 A | 9/1998 | De Lange et al. | 380/28 |
| 5,815,146 A | 9/1998 | Youden et al. | 345/327 |
| 5,818,934 A | 10/1998 | Cuccia | |
| 5,825,879 A | 10/1998 | Davis | |
| 5,850,218 A | 12/1998 | LaJoie et al. | |
| 5,852,290 A | 12/1998 | Chaney | |
| 5,852,470 A | 12/1998 | Kondo et al. | |
| 5,870,474 A | 2/1999 | Wasilewski et al. | |
| 5,894,320 A | 4/1999 | Vancelette | 348/7 |
| 5,894,516 A | 4/1999 | Brandenburg | 380/4 |
| 5,897,218 A | 4/1999 | Nishimura et al. | 386/94 |
| 5,915,018 A | 6/1999 | Aucsmith | 380/4 |
| 5,917,915 A | 6/1999 | Hirose | |
| 5,922,048 A | 7/1999 | Emura | 709/219 |
| 5,949,877 A | 9/1999 | Traw et al. | 380/4 |
| 5,949,881 A | 9/1999 | Davis | |
| 5,973,679 A | 10/1999 | Abbott et al. | 345/302 |
| 5,999,622 A | 12/1999 | Yasukawa et al. | 380/4 |
| 5,999,698 A | 12/1999 | Nakai et al. | 386/125 |
| 6,005,561 A | 12/1999 | Hawkins et al. | 345/327 |
| 6,011,849 A | 1/2000 | Orrin | 380/42 |
| 6,012,144 A | 1/2000 | Pickett | 713/201 |
| 6,021,199 A | 2/2000 | Ishibashi | 380/10 |
| 6,021,201 A | 2/2000 | Bakhle et al. | |
| 6,028,932 A | 2/2000 | Park | |
| 6,049,613 A | 4/2000 | Jakobsson | 380/47 |
| 6,057,872 A | 5/2000 | Candelore | 348/3 |
| 6,058,186 A | 5/2000 | Enari | 380/10 |
| 6,061,451 A | 5/2000 | Muratani et al. | |
| 6,064,748 A | 5/2000 | Hogan | 382/100 |
| 6,065,050 A | 5/2000 | DeMoney | 709/219 |
| 6,069,647 A | 5/2000 | Sullivan et al. | 348/5.5 |
| 6,072,873 A | 6/2000 | Bewick | 380/217 |
| 6,073,122 A | 6/2000 | Wool | |
| 6,088,450 A | 7/2000 | Davis et al. | |
| 6,105,134 A | 8/2000 | Pinder et al. | |
| 6,118,873 A | 9/2000 | Lotspiech et al. | |
| 6,134,551 A * | 10/2000 | Aucsmith | 707/10 |
| 6,154,206 A | 11/2000 | Ludtke | |
| 6,157,719 A | 12/2000 | Wasilewski et al. | |
| 6,185,369 B1 | 2/2001 | Ko et al. | 386/125 |
| 6,185,546 B1 | 2/2001 | Davis | |
| 6,189,096 B1 * | 2/2001 | Haverty | 713/155 |
| 6,192,131 B1 * | 2/2001 | Geer et al. | 380/247 |
| 6,199,053 B1 | 3/2001 | Herbert et al. | |
| 6,204,843 B1 | 3/2001 | Freeman et al. | 346/327 |
| 6,209,098 B1 | 3/2001 | Davis | |
| 6,215,484 B1 | 4/2001 | Freeman et al. | 345/327 |
| 6,226,618 B1 | 5/2001 | Downs et al. | 705/1 |
| 6,229,895 B1 | 5/2001 | Son et al. | 725/95 |
| 6,230,194 B1 * | 5/2001 | Frailong et al. | 709/220 |
| 6,230,266 B1 * | 5/2001 | Perlman et al. | 713/156 |
| 6,233,577 B1 * | 5/2001 | Ramasubramani et al. | 707/9 |
| 6,247,127 B1 * | 6/2001 | Vandergeest | 713/100 |
| 6,256,747 B1 * | 7/2001 | Inohara et al. | 709/201 |
| 6,263,506 B1 | 7/2001 | Ezaki et al. | |
| 6,266,416 B1 | 7/2001 | Sigbjornsen et al. | |
| 6,266,480 B1 | 7/2001 | Ezaki et al. | |
| 6,272,538 B1 * | 8/2001 | Holden et al. | 709/223 |

| | | |
|---|---|---|
| 6,278,783 B1 | 8/2001 | Kocher et al. |
| 6,289,455 B1 | 9/2001 | Kocher et al. |
| 6,292,892 B1 | 9/2001 | Davis |
| 6,307,939 B1 | 10/2001 | Vigarie ........................ 380/210 |
| 6,311,012 B1 | 10/2001 | Cho et al. ..................... 386/98 |
| 6,330,672 B1 | 12/2001 | Shur ........................... 713/176 |
| 6,351,538 B1 | 2/2002 | Uz |
| 6,378,130 B1 | 4/2002 | Adams ......................... 725/95 |
| 6,389,533 B1 | 5/2002 | Davis et al. |
| 6,389,537 B1 | 5/2002 | Davis et al. |
| 6,415,101 B1 | 7/2002 | deCarmo et al. ........... 386/105 |
| 6,430,361 B2 | 8/2002 | Lee .............................. 386/98 |
| 6,442,689 B1 * | 8/2002 | Kocher ........................ 713/158 |
| 6,449,718 B1 | 9/2002 | Rucklidge et al. .......... 713/168 |
| 6,459,427 B1 | 10/2002 | Mao et al. ................... 345/327 |
| 6,463,152 B1 | 10/2002 | Takahashi ................... 380/201 |
| 6,466,671 B1 | 10/2002 | Maillard et al. |
| 6,510,554 B1 | 1/2003 | Gordon et al. ................ 725/90 |
| 6,519,693 B1 | 2/2003 | Debey |
| 6,529,526 B1 | 3/2003 | Schneidewend |
| 6,543,053 B1 | 4/2003 | Li et al. ........................ 725/88 |
| 6,587,561 B1 | 7/2003 | Sered et al. ................. 380/241 |

OTHER PUBLICATIONS

Shavik Kirstnamurthy, Securant Technologies Delivers Broad PKI Integration to Enable standars Based security, Oct. 4, 1999, Business Wires.*

"McCormac Hack Over Cablemodem", *HackWatch*. http://www.hackwatch.com/cablemodbook.html, (Aug. 10, 1998).

"Message Authentication with Partial Encryption", *Research disclosure RD* 296086, (Dec. 10, 1998).

"Metro Media PVR–DVD–MP3–Web", *Internet publication from* www.metrolink.com, (undated).

"New Digital Copy protection Proposal Would Secure Authorized Copies", *PR Newswire*, (Nov. 13, 1998), 1–3.

Agi, Iskender, et al., "An Empirical Study of Secure MPEG Video Transmissions", *IEEE*, Proceedings of SNDSS ?96, (1996), 137–144.

Alattar, Adnan, et al., "Evaluation of Selective Encryption Techniques for Secure Transmission of MPEG–Compressed Bit–Streams", *IEEE*, (1999),IV–340 To IV–343.

Alattar, Adnan M. et al., "Improved Selective Encryption Techniques for Secure Transmission of MPEG Video BIt–Streams", *IEEE*, (1999),256–260.

Aravino, H., et al., "Image and Video Coding Standards", *AT&T Technical Journal*, (Jan./Feb.1993), 67–68.

Dittmann, Jana, et al., "Multimedia and Security Workshop at ACM Multimedia", Bristol, U.K., (Sep. 1998).

Dondeti, Lakshminath R., et al., "A Duel Protocol for Scalabe Secure Multicasting", *1999 International Symposium on Computers and Communication,* Jul. 6–8, 1999., (Jul. 1999).

Gonzalez, R. C., et al., "Digital Image Processing", *Addison Wesley* Pulishing Company, Inc., (1992),346–348.

Kim, et al., "Bit Rate Reduction Algorithm for a Digital VCR", *IEEE Transactions on Consumer Electronics*, vol. 37, No. 3, (Aug. 1, 1992),267–274.

Kondo, et al., "A New Conceaiment Method for Digital VCRs", *IEEE Visual Signal Processing and Communication,* Melborne, Australia, (Sep. 1993),20–22.

Kondo, et al., "Adaptive Dynamic Range Coding Scheme for Future Consumer Digital VTR", 219–226.

Kondo, et al., "Adaptive Dynamic Range Coding Scheme for Furture HDTV Digital VTR", Sony Corporation, (1991).

Kunkelmann, Thomas, "Applying Encryption to Video Communication", *Multimedia and Securtiy Workshop at ACM Multimedia ?98, Briston, U.K.,* (Sep. 1998), 41–47.

Menezes, Alfred J., et al., "Handbook of Applied Cryptography", *CRC Press*, 551–553.

NHK Laboratories Note, "Error Correction, Concealment and Shuffling", No. 424, (Mar. 1994),29–44.

Qiao, Lintian, et al., "Comparison of MPEG Encryption Algorithms", *Department of Computer Science, University of Illinois at Urbana–Champalon*, (Jan. 17, 1998),1–20.

Shi, Changgui, et al., "An Efficient MPEG Video Encryption Algorithm", 1998 *IEEE, Department of Computer Sciences, Purdue University, West Lafayette, IN,* 381–386.

Spanos, George A., et al., "Performance Study of a Selective Encryption Scheme for the Security of Networked, Real–Time Video", IEEE, (1995),2–10.

Taylor, Jim, "DVD Demystified –The Guidebook for DVD–Video and DVD–ROM", Pub. McGraw–Hill, ISBN: 0–07–064841–7, pp. 134–147, (1998),134–147.

Tom, et al., "Packet Video for Cell Loss Protection Using Deinterleaving and Scrambling", *ICASSP 91: 1991 International Conference on Acoustic, Speech and Signal Processing*, vol. 4, (Apr. 1991),2857–2860.

Wu, S. Felix, et al., "Run–Time Performance Evaluation for a Secure MPEG System Supporting Both Selective Watermarking and Encryption", submitted to JSAC special issue on Copyright and Privacy Protection, (Mar. 1, 1997).

Zeng, Wenjun et al., "Efficient Frequency Domain Video Scrambling for Content Access Control", In Proc. ACM Multimedia, (Nov. 1999).

Zhu, et al., "Coding and Cell–Loss Recovery i DCT–Based Packet Video", *IEEE Transactions on Circuit and Systems for Video Technolgy*, No. 3, NY, (Jun. 3, 1993).

* cited by examiner

GENERAL FORMAT OF CA ENTITLEMENT CONTROL MESSAGES (ECMs):

NEW INFORMATION

| CRL VERSION #, CRL RECEPTION TIME, CGMS 310 | ENCRYPTED KEY 320 | ACCESS REQUIREMENTS 330 | SIGNATURE 340 |

FIG. 3

METHOD AND APPARATUS FOR IMPLEMENTING REVOCATION IN BROADCAST NETWORKS

BACKGROUND OF THE INVENTION

1. Field of the Invention

The present invention relates to digital devices. More specifically, the present invention relates to a copy management system and method for controlling the reproduction and recording of digital content on and from at least one digital device.

2. General Background

Analog communication systems are rapidly giving way to their digital counterparts. Digital television is currently scheduled to be available nationally to all consumers by the year 2002 and completely in place by the year 2006. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to, this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who desire to prevent the unauthorized and uncontrolled copying of copyrighted, or otherwise protected, material.

In response, there is a movement to require service providers, such as terrestrial broadcast, cable and direct broadcast satellite (DBS) companies, and companies having Internet sites which provide downloadable content, to introduce protection schemes. Two such copy protection systems have been proposed by the 5C group of the Data Hiding Sub Group (DHSG) (5C comprising representatives of Sony, Hitachi, Toshiba, Matsushita, and Intel) and the Data Transmission Discussion Group (DTDG), which are industry committee sub-groups of the Copy Protection Technical Working Group (CPTWG). The CPTWG represents the content providers, computer and consumer electronic product manufacturers.

The DTDG Digital Transmission Copy Protection (DTCP) proposal is targeted for protecting copy-protected digital content, which is transferred between digital devices connected via a digital transmission medium such as an IEEE 1394 serial bus. Device-based, the proposal uses symmetric key cryptographic techniques to encode components of a compliant device.

This allows for the authentication of any digital device prior to the transmission of the digital content in order to determine whether the device is compliant. The digital content is itself encoded prior to transmission so that unauthorized copying of the content will result in copy having an unintelligible format.

Thus, even today, the functionality of digital devices such as set-top boxes, digital televisions, digital audio players, and similar such digital devices extends beyond their historical role of conditional access (CA), i.e., merely descrambling content to a CA-clear format for real-time viewing and/or listening, and now include constraints and conditions on the recording and playback of such digital content. For example, currently, copying of scrambled content for subsequent descrambling and viewing or listening may be permitted with the appropriate service/content provider authorization or key provided to the digital device.

SUMMARY OF THE INVENTION

A method of revoking a descrambling privilege for copy controlled content to a host device is provided. The method includes receiving copy controlled content at a conditional access module. A revocation list is also received at the module. The method includes determining whether the host device associated with the module is on the list. If so, the conditional access module will not descramble the content.

BRIEF DESCRIPTION OF THE DRAWINGS

The present invention is illustrated by way of example and not by way of limitation in the figures of the accompanying drawings, in which like references indicate similar elements and in which:

FIG. 3 shows an embodiment of an ECM that includes a CRL version number.

DETAILED DESCRIPTION

Figure 1:
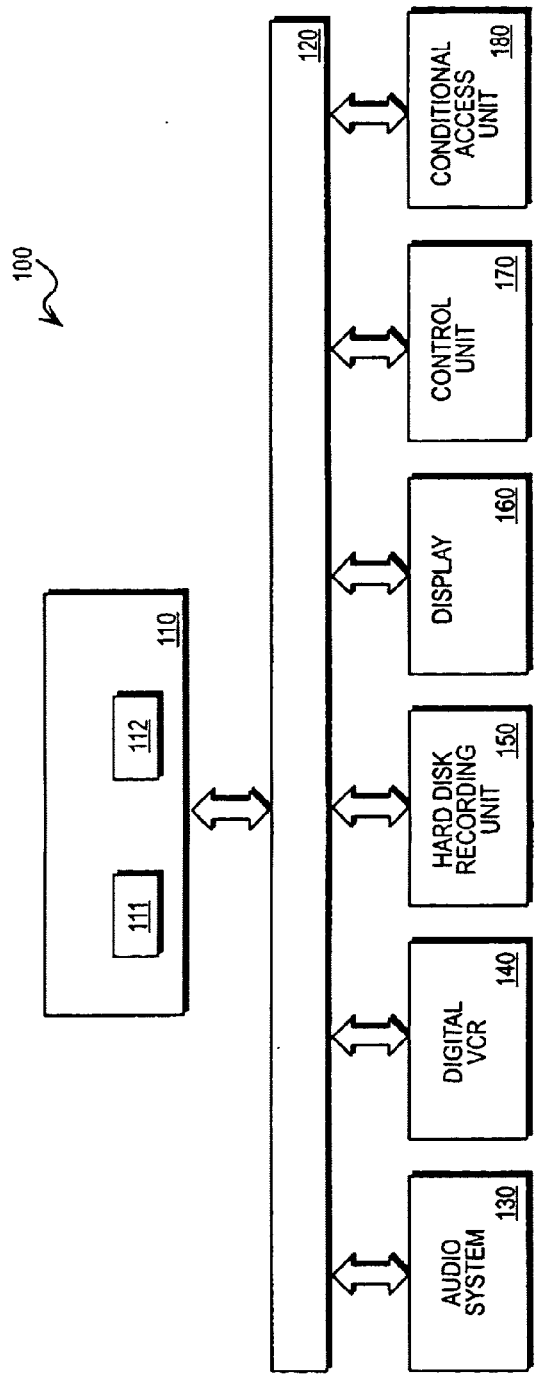
FIG. 1 is a block diagram of an exemplary entertainment system including one embodiment of a digital device.

FIG. 1 is a block diagram of an entertainment system 100 including one embodiment of the copy management system of the present invention. The entertainment system 100 includes a digital device 110 for receiving a digital bitstream including program data from one or more service providers. Such service or content providers can include terrestrial broadcasters, cable operators, direct broadcast satellite (DBS) companies, companies providing content for download via the Internet, or any similar such content and/or service provider. The program data may include system information, entitlement control messages, entitlement management messages, content, and other data, each of which will be described briefly. System information may include information on program names, time of broadcast, source, and a method of retrieval and decoding, and well as copy management commands that provide digital receivers and other devices with information that will control how and when program data may be replayed, retransmitted and/or recorded. These copy management commands may also be transmitted along with entitlement control messages (ECM), which are generally used by the conditional access unit to regulate access to a particular channel or service. Entitlement management messages (EMM) may be used to deliver privileges to the digital receiver 111 such as rights, access parameters, and descrambling keys. As known, a decryption key is generally a code that is required to restore scrambled data, and may be a function of the rights granted. Finally, content in the program data stream may include audio and video data, which may be in a scrambled or clear format.

The digital device or host may be a device within a group including a set top box, television, video player, video recorder, hand disk player, hard disk recorder, personal computer, memory stick recorder, minidisk player, minidisk recorder, digital video disk (DVD) player, DVD recorder, compact disk (CD) player, and CD recorder.

The digital device or host 110 includes a digital receiver 111, which processes the incoming bitstream, extracts the program data therefrom, and provides the program data in a viewable format. The thus extracted program data is then provided to a decoding unit 112 for further processing, including separation of the system information from the content, as well as decoding, or decompressing, of the content to its original form. The digital receiver 111 also regulates access to the program data by other components on the entertainment system 100, and according to one embodiment of the present invention, supports the simultaneous transmission of program data having content in a descrambled format (hereinafter referred to as "descrambled content") and program data having content in a scrambled format (hereinafter referred to as "scrambled content").

According to one embodiment of the present invention, the digital device 110 is a digital television set where the digital receiver 111 is a set-top box integrated therein, and the decoding unit 112 is an MPEG (Motion Picture Experts Group) decoder. The digital television set's display (not shown) is, according to this embodiment, integrated within the digital device 110. Alternatively, it will be appreciated that the digital device 110 may include only the digital receiver 111 and/or the decoder unit 112, with a display being external to the decoding device 110. An example of this embodiment would be an integrated receiver/decoder (IRD) such as a stand-alone set-top box which outputs NTSC, PAL or $Y_pB_pR$ signals. All such embodiments are included within the scope of the present invention.

Digital device 110 may be coupled to other components in the entertainment system 100 via a transmission medium 120. The transmission medium 120 operates to transmit control information and data including program data between the digital device 110 and other components in the entertainment system 100. It will be appreciated that the entertainment system 100 of FIG. 1 is merely an exemplary embodiment, and that other analog and/or digital components may be added or substituted for the components briefly described hereinafter.

Referring to FIG. 1, the entertainment system 100 may include an audio system 130 coupled to the transmission medium 120. The audio system 130 may include speakers and an audio player/recorder such as a compact disc player, a Sony MiniDisc® player, or other magneto-optical disc that may be used to play and/or record audio data. A digital VCR 140, such as a D-VHS VCR, may also be coupled to the digital device 110 and other components of the entertainment system 100 through the transmission medium 120. As known, the digital VCR 140 may be used to record analog or digital audio, video, and other data transmissions, and according to an embodiment of the present invention, may be used to record program data received by the digital device 110 and transmitted to the digital VCR over transmission medium 120.

A hard disk recording unit 150 may also be coupled to digital device 110 and other components via transmission medium 120. The hard disk recording unit 150 may be a personal computer system, a stand-alone hard disk recording unit, or other hard disk recording device capable of recording analog or digital audio, video and data transmissions. As with digital VCR 140, according to one embodiment of the present invention, the hard disk recording unit 150, may be used to record program data received by the digital device 110 and transmitted to the hard disk recording unit 150 over transmission medium 120.

Display 160 may include a high definition television display, a monitor or other device capable of processing digital video signals. In an embodiment where the digital device 110 is a stand-alone set-top box, display 160 may be a digital television set.

Finally, a control unit 170 may be coupled to the transmission medium 120. The control unit 170 may be used to coordinate and control the operation of some or each of the components on the entertainment system 100, as well and other electronic devices remotely coupled thereto.

Figure 2:
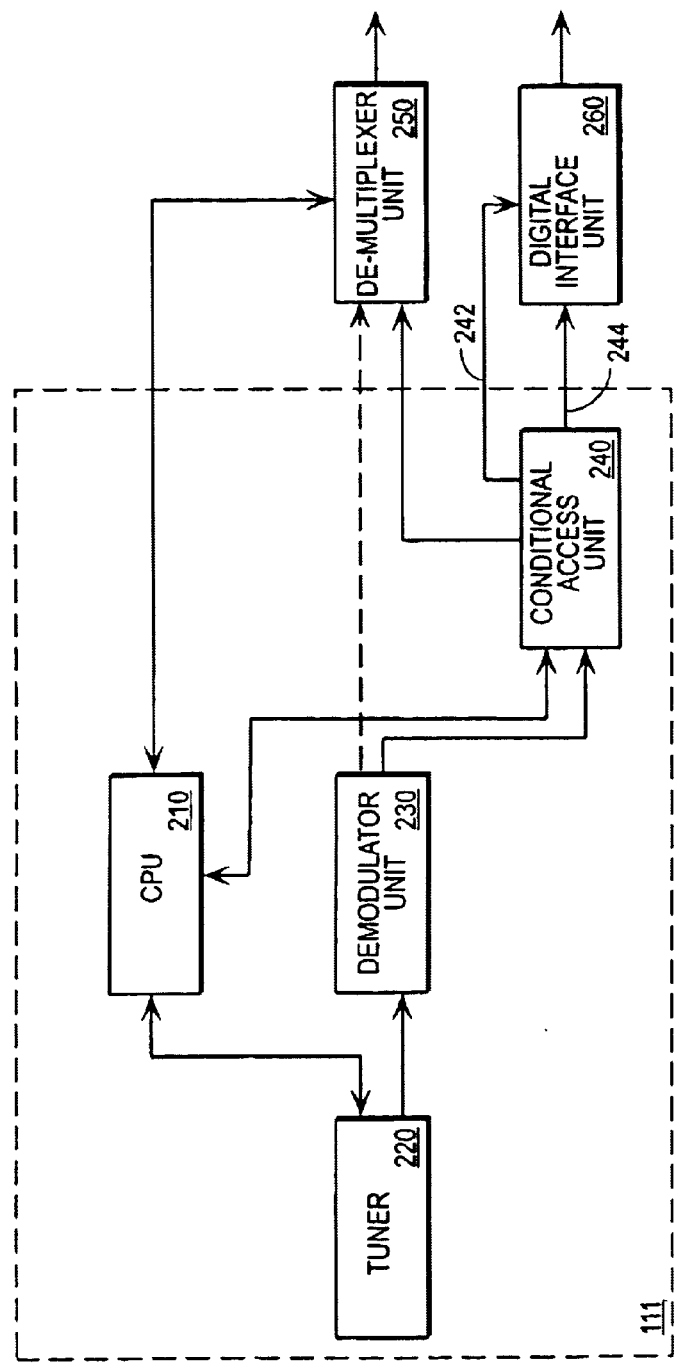
FIG. 2 is a block diagram of one embodiment of a digital receiver of the digital device.

FIG. 2 is a block diagram of one embodiment of the digital receiver 111 including the copy management system according to the present invention. The digital receiver 111 includes a central processing unit (CPU) 210, which controls the overall operation of the digital receiver 111, and determines the frequency in which a selected channel is broadcast or otherwise transmitted. This information is then transmitted to a tuner 220, which then selects the appropriate frequency of the terrestrial, cable, satellite, or Internet transmission in which to receive the incoming digital bitstream, including program data. The CPU 210 may also support a graphical user interface (GUI), such as an electronic programming guide (EPG), the latter allowing a user to navigate through various channels and program options to select a desired channel or program for viewing, listening, recording and the like. The GUI may be displayed on either a display (not shown) of digital device 110 (e.g., where digital device 110 is a digital television set), or on display 160 (e.g., where digital device 110 is a stand-alone set-top box).

Once the tuner 220 has selected the appropriate frequency, it amplifies the incoming digital bitstream, and provides the output bitstream to a demodulator unit 230. The demodulator unit 230 receives the bitstream from the tuner 220 and demodulates the bitstream to provide program data as originally transmitted. The type of demodulation effected by the demodulator unit 230 will of course depend on the type of transmission as well as the modulation process used in the transmission process. For example, in the case of cable transmissions and Internet transmissions received over cable modems, the demodulator unit 230 may perform quadrature amplitude demodulation (QAD), while for satellite broadcasts, quadrature phase shift key (QPSK) demodulation will likely be required.

Terrestrial broadcasts, will likely require vestigial side band (VSB) demodulation. The present invention is not limited to any one type of transmission and modulation/demodulation scheme, and other schemes are within the scope and spirit of the present invention. In addition to effecting the demodulation process, demodulator unit 230 may also perform error correction on the received bitstream.

The thus demodulated bitstream is now preferably provided to a conditional access unit 240. (That portion of the demodulated bitstream that is not encrypted may bypass the conditional access unit 240 and be provided directly to the demultiplexer 250 as shown by the dashed lines in FIG. 2. This might also be the case where none of the bitstream needs decrypting, and/or where there is no conditional access module). The conditional access unit 240 generally performs key management and decryption, as well as descrambling functions as follows.

Typically, if the CPU 210 determines that the program data in the digital bitstream includes scrambled content, that program data is provided to a conditional access unit 240. At this point the CPU 210 may transmit packet identifier (PID) information to the conditional access unit 240, such PID information informing the conditional access unit 240 where in the program data the ECM may be found. The CPU 210 may instead receive the ECM and deliver it to the conditional access unit 240. Alternatively, the conditional access unit 240 may have demultiplexing capabilities allowing it to directly obtain the location of the ECM from the bitstream itself. As discussed previously, the ECMs regulate a user's access to a particular channel or service, and determines the access rights that are needed to be held by a receiver 111 in order to grant access. The ECMs may also be used to deliver a decrypting or descrambling key or to deliver information (e.g., an algorithm) as to how to derive a key that may be used to descramble scrambled content. Using such key or information regarding derivation of such key, the conditional access unit 240 may descramble the content contained in the program data. Alternatively, the conditional access unit may provide the key to the demultiplexer 250 which will perform the descrambling.

Importantly, although the conditional access unit 240 is shown as an integral, or embedded, in that both the descrambling and decrypting functions are effected internally in receiver 111, the conditional access unit may also split or external. An external conditional access unit descrambles the program data content and decrypts the keys externally; e.g., as is the case with the National Renewable Security System (NRSS) conditional access modules. In a split conditional access unit, the program data content is descrambled within the digital receiver 111, while the key decryption is completed externally, e.g., via a "smart card." All of these systems are intended to be within the spirit and scope of the present invention.

Once the conditional access unit 240 descrambles the program data content, the program data is input to demultiplexer unit 250, which separates the system information from the content in the program data. According to an embodiment of the demultiplexer unit 250, the demultiplexer unit 250 parses the program data for PIDs that are associated with system information, audio information, and video information, and then transmits the system information to the CPU 210 and the audio and video information to the decoder unit 112. In accordance with one embodiment of the present invention, a digital interface unit 260 is coupled to the conditional access unit 240. Operation of this unit, which allows the receiver 111 to communicate with other digital components in the entertainment system 100, will be discussed at a later point.

The CPU 210, tuner 220, demodulator unit 230, conditional access unit 240, demultiplexer unit 250, and digital interface unit 260 may be implemented using any known technique or circuitry. In one embodiment of the present invention, the CPU 210, tuner 220, demodulator unit 230, demultiplexer unit 250, and digital interface unit 260 all reside in a single housing, while the conditional access unit 240 may reside in an external NRSS-A or NRSS-B conditional access module (as discussed above). Alternatively, the conditional access unit can take the form factor of a Personal Computer Memory Card International Association (PCMCIA) Type 11 card or a smart card or the like. For example, the conditional access unit may take the form of a Point of Deployment (POD) module or an ISO 7816 smart card.

The content of a digital program may be transmitted in scrambled form. In order for a conditional access unit to recover the scrambled content and permit a person to view the content in clear form, the unit must have the necessary access requirements associated with the scrambled content. An access requirement includes a message that describes the features that the conditional access unit must have in order to decode the scrambled content. The scrambled content may be referred to as "copy controlled content." For example, a certain key may be needed to view the content. Alternatively, a service tag associated with a given content provider may be required. Technical requirements such as a particular descrambling method may also be required and included as a part of the access requirements. The access requirements associated with a particular program may be transmitted to a conditional access unit along with the program.

Thus, after the host 110 has the access requirements necessary to view a given program content, the host 110 has access to display the content in the clear on display 160 unless that host's access has been revoked. When the host's access has been revoked, the revocation information is sent to a conditional access (CA) unit 240 associated with the host. The revocation information is sent to the CA unit 240 in a certified revocation list (CRL), which may be trickled out over a network. The network may be a home network using a Universal Serial Bus, Blue Tooth, and Panel Link communication mediums. The revocation information includes a list of hosts whose access has been revoked. In one embodiment, the revocation is for the entire service. Alternatively, the revocation may be limited to a specific content provider, such as HBO for example, thus allowing the host to display the content of other channels that have not been revoked.

The revocation list is sent to the CA unit 240 on a well known packet identifier (PID). In a cable network system, the certificate revocation lists may be sent in-band, along with the program content, which allows for easier time shifting by bitstream recorders. Alternatively, the CRL may be sent to the CA unit in an out of band (OOB) channel, by telephone wires, or by a modem if sent OOB, then it can be delivered to multicast IP addresses. The revocation list can be received and read in real time. Thus, the CRL does not need to be stored, which reduces the overall system memory requirements.

The revocation lists can be divided into lists for different groups of hosts. Multiple lists, where each list corresponds to a different group of hosts, can be sent to the CA units. The CA unit only has to read the list for the corresponding host's group. For example, if the host identifier (ID) is a numeric value, then the range of the host IDs in a given list can be used by the CA unit to quickly determine whether the given list may contain revocation information for the corresponding host. Thus, the CA module can ignore CRLs that have host ID ranges greater than or less than the ID value for the corresponding host of the CA unit.

If the CRL has a range of values that bound the corresponding host's numerical ID value, the CA unit may check the CRL. In one embodiment, the CRL is checked when the CA unit is initially associated with the corresponding host. In another embodiment, the CRL may be checked when a new version of the CRL is sent to the CA unit. The CA module can compare the version number of the received CRL with the version number of the last checked CRL stored in the CA unit's memory. If the received version number is greater than the stored version number, the newly received CRL is read to determine whether the host is on the list.

An embodiment of an ECM that includes the CRL version number is shown in FIG. 3. The CRL version information includes the CRL version number and reception time, 310.

The ECM may further include the encrypted key 320 for descrambling content, access requirements 330, and an optional signature 340. This ECM allows the CA module to know which CRL version number is the current version number. The CRL itself may be formatted as a data structure. In one embodiment, the CRL is formatted as a private syntax information (PSI) data structure, which is well known in the art. The PSI data structure may also be a MPEG PSI data structure.

The information in the CRL may be filtered and read by either the host or the CA unit. The CA module determines whether the host device appears on the list. Also, if the host device has a 1394 digital interface, the host device can use the CRL information to determine whether other devices in the 1394 home network appear on the list. In one embodiment, there may be two lists, where one list is for the CA hosts and 1394 devices, and the other list is for the other devices. The size of the second list would be substantially smaller than the first list, so that it could be stored in the memory of the host and other devices.

If the host for the CA unit is identified in the revocation list, then the CA unit will not decode the scrambled program content for the corresponding host. Whenever a CA unit identifies a host in the CRL, the host is marked as revoked in the internal memory of the CA module. The host may be un-revoked if the host does not appear in a subsequent CRL.

The CA unit includes a memory that stores the revocation status for a plurality of hosts that the CA unit has been connected to. Also, the CA unit can determine the revocation status of program content that has been stored in scrambled form in a digital memory, such as tape for example. If the version number of the CRL stored on the tape is smaller than the version number in the CA unit's memory, then the CA unit will ignore the revocation information stored on the tape.

Alternatively, the CA unit can speculatively and tentatively descramble the program content for a given period of time before the CA unit receives the revocation list. For example, if the CA unit has not received a CRL for the host, the CA unit can descramble the scrambled content for a given period of time, called a timeout period. The timeout period can be determined at the headend or broadcast station, and sent to the CA unit in an ECM. The timeout period may be long enough for the CA unit to receive the CRL multiple times before the timeout period ends, but short enough so that a pirate may not receive significant portions of the content before the timeout period ends.

The timeout counter, once started, will continue to count down to the end of the timeout period, even if a user changes the content that is descrambled, for example, by changing the channel of the tuner. If the CA unit checks the CRL list for the host during the timeout period and the host is not on the list, then the CA unit may continue to descramble the program content. If the host is on the list, then the CA unit ceases to descramble. Also, if the timeout period ends before the CA unit checks the CRL, the CA unit stops descrambling the program content.

Figure 4:
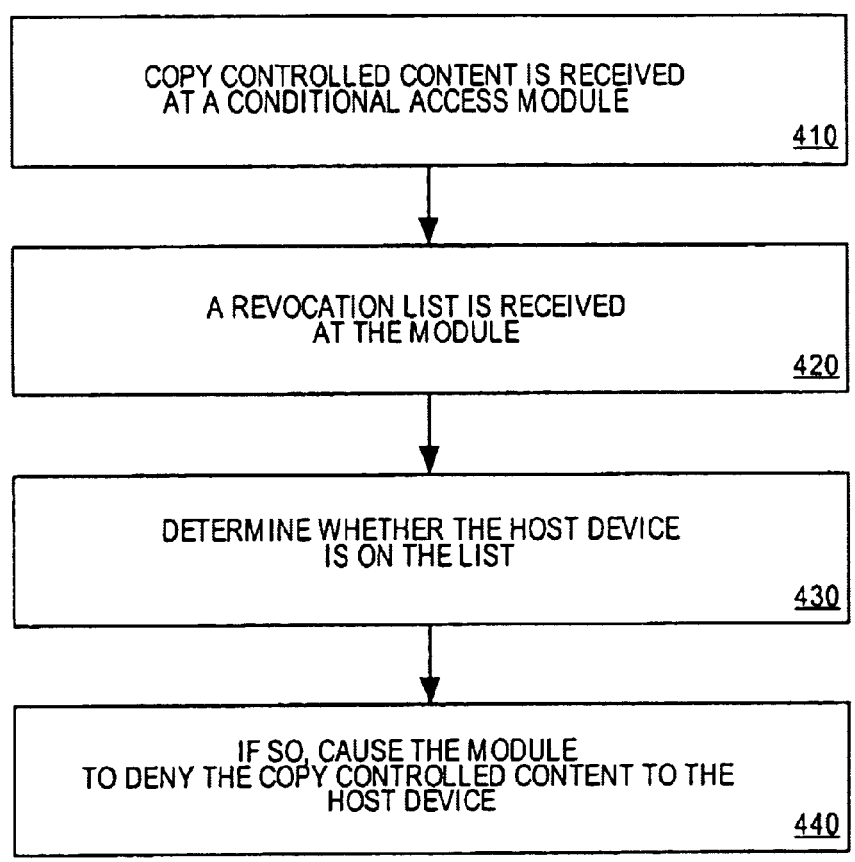
FIG. 4 shows an embodiment of a method of revoking.

FIG. 4 shows an embodiment of a method of revoking. Scrambled copy controlled content is received at a conditional access module, 410, a revocation list is received at the module, 420. The method includes determining whether the host device is associated with the module is on the list, 430. If so, the method causes the conditional access module to deny the content controlled to the host device, 440. The conditional access module may also not descramble the copy controlled content.

While the invention is described in terms of embodiments in a specific system environment, those of ordinary skill in the art will recognize that the invention can be practiced, with modification, in other and different hardware and software environments within the spirit and scope of the appended claims.

What is claimed is:

1. A method for controlling access to copy controlled content to a host device comprising:

receiving copy controlled content;

receiving a revocation list corresponding to a given range of host identifiers;

verifying that an identifier of a host device associated with an access module is within the range of host identifiers;

determining whether the host device associated with the access module is on the revocation list after the identifier of the host device is verified to be within the range of the host identifiers for the revocation list; and if the identification of the host device is on the revocation list, causing the associated access module to deny the copy controlled content to the host device.

2. The method of claim 1, wherein the revocation list is received in band as part of a digital bitstream including the copy controlled content.

3. A method comprising:

receiving copy controlled content;

receiving a revocation list corresponding to a given range of host identifiers;

the revocation list is received out of band over a separate channel from a digital bitstream including the copy controlled content;

determining whether a host device associated with an access module is on the revocation list; and if the host device is on the revocation list, causing the associated access module to deny the copy controlled content to the host device.

4. The method of claim 3, wherein the revocation list is MPEG private syntax information data structure.

5. The method of claim 1, wherein the receiving of the revocation list comprises receiving a plurality of revocation lists, where each list corresponds to a given range of host identifiers.

6. The method of claim 5, wherein verifying that the identifier of the host device associated with the access module is within the range of host identifiers comprises determining which revocation list of the plurality of revocation lists comprises a range of host identifiers within which the identifier of the host device is bounded.

7. The method of claim 1 further comprising allowing access to the copy controlled content if the host device is not on the revocation list.

8. The method of claim 1, wherein prior to verifying the method further comprises authenticating the revocation list as having a larger revocation list version number.

9. The method of claim 1, wherein the copy controlled content is denied to the host device by not descrambling the copy controlled content.

10. The method of claim 1, wherein the host is selected from the group including of a set top box, television, video player, video recorder, hard disk player, hard disk recorder, personal computer, memory stick recorder, minidisk player, minidisk recorder, digital video disk (DVD) player, DVD Recorder, compact disk (CD) player and CD recorder.

11. The method of claim 1, wherein the revocation list is transmitted to devices coupled to a home network, the home network using a communication medium from one of the group: 1394, Universal Serial Bus, Blue Tooth, and Panel Link.

12. The method of claim 1, wherein the access module performs conditional access by not descrambling the copy controlled content for the host device on the revocation list.

13. The method of claim 1, wherein the access module denies the copy controlled content by not outputting the copy controlled content to the host device on the revocation list.

14. The method of claim 12, wherein the access module is selected from the group consisting of an NRSS-A module, NRSS-B module, Point of Deployment (POD) module, and ISO7816 smart card.

15. The method of claim 1, further comprising conditionally descrambling the copy controlled content by the access module if the identifier of the host device is not on the revocation list.

16. An apparatus for controlling access to copy controlled content to a host device comprising:
   means for receiving copy controlled content;
   means for receiving a revocation list corresponding to a range of identifiers;
   means for determining whether a host device associated with an access module is on the revocation list after an identifier of the host device is determined to be within the range of identifiers associated with the revocation list;
   means for causing the access module to deny the copy controlled content to the host device if the identifier associated with the host device is on the revocation list.

17. The apparatus of claim 16, wherein the revocation list is received by the access unit in band along with the copy controlled content.

18. The apparatus of claim 16, wherein the revocation list is received by the access unit out of band of the copy controlled content.

19. The apparatus of claim 16 further comprising means for descrambling the copy controlled content if the host device is not on the revocation list.

20. The apparatus of claim 16, wherein the revocation list contains revocation information that is content specific.

21. A computer readable medium containing instructions, which when executed by a processing system, controls access to copy controlled content, the computer readable medium comprising:
   means for receiving copy controlled content;
   means for receiving a plurality of revocation lists each corresponding to a different range of host identifiers;
   means for determining whether a host device associated with an access module is on the revocation list by initially verifying whether an identifier of the host device is within a range of host identifiers associated with one of the plurality of revocation lists, and if so, verifying whether the identifier of the host device is contained in the one of the plurality of revocation lists;
   means for causing the associated access module to deny the copy controlled content to the host device.

22. The computer readable medium of claim 21, wherein the revocation list is received in band along with the copy controlled content.

23. The computer readable medium of claim 21, wherein the revocation list is received out of band of the copy controlled content.

24. The computer readable medium of claim 21, wherein each of said means for receiving, copy controlled and said means for receiving the plurality of revocation lists are executable instructions.

25. The computer readable medium of claim 21, wherein the copy controlled content is denied to the host device by not descrambling the copy controlled content.

26. The computer readable medium as set forth in claim 21, wherein the copy controlled content is not output to the host device if the host device is on the revocation list.

27. A device for controlling access to copy controlled content, comprising:
   a tuner to tune to a selected frequency for receipt of the copy controlled content;
   a demodulator unit coupled to the tuner, the demodulator unit to demodulate the copy controlled content and output the demodulated copy controlled content; and
   an access unit configured to receive the demodulated copy controlled content and a plurality of revocation lists each corresponding to a different range of host identifiers, the access unit to determine whether an identifier of the device is within a range of any of the plurality of revocation lists, and if so, to (i) determine whether the identifier of the device on one of the plurality of revocation lists and (ii) deny the copy controlled content to the device if the identifier is listed on one of the plurality of revocation lists.

28. The device of claim 27, wherein the plurality of revocation lists are received in band as part of the same digital bistream with the copy controlled content.

29. The device of claim 27, wherein the plurality of revocation lists are received out of band being transmitted through a separate medium than the copy controlled content.

30. The device of claim 29, wherein the plurality of revocation lists are received over a telephone line and the copy controlled content is received over either a cable or a wireless satellite transmission.

31. The device of claim 27, wherein each of plurality of revocation lists corresponds to a different group of devices.

32. The device of claim 27, further comprising a processor coupled to the access unit.

33. The device of claim 32, wherein the processor to receive an enhancement control message, the enhancement control message including a key to descramble the copy controlled content.

34. The device of claim 32, wherein the access unit receives the enhancement control message along with the copy controlled information and the processor transmits information to the access unit to enable the access unit to locate the enhancement control message.

35. The device of claim 34, wherein the enhancement control message received by the access unit further includes a version number associated with the plurality of revocation lists.

36. A method for controlling access to copy controlled content to a device comprising:
   receiving a revocation list corresponding to a given range of identifiers;
   verifying that an identifier of a device is within the range of idnetifiers;
   determining whether the device is on the revocation list after the identifier of the device is verified to be within the range of the identifes for the revocation list; and
   denying copy controlled content to the device if the device is on the revocation list.

37. The method of claim 36, wherein the revocation list is received in band as part of a digital bitstream including the copy controlled content.

38. The method of claim 36, wherein the identifier is a host identifier being a numeric value.

39. The method of claim 36 further comprising allowing access to the copy controlled content if the device is not on the revocation list.

40. The method of claim 36, wherein the revocation list is reached by the device coupled to a home network, the home network using a wired communication medium.

41. The method of claim 40, wherein the revocation list is reached by the device coupled to the home network using the wired communication medium in accordance with IEEE 1394.

42. The method of claim 36, wherein the revocation list is reached by the device coupled to a home network, the home network using a wireless communication medium.

* * * * *